3 Sheets—Sheet 1.

E. BALL.

Mower.

No. 1,010.

Reissued July 17, 1860.

Witnesses
A. C. Wadsworth
H. M. Surley

Inventor:
E. Ball
By his Attorney
Thos. H. Dodge

N. PETERS, Photo-Lithographer, Washington, D. C.

E. BALL.
3 Sheets—Sheet 2.
Mower.
No. 1,010.
Reissued July 17, 1860.
Fig. 5.
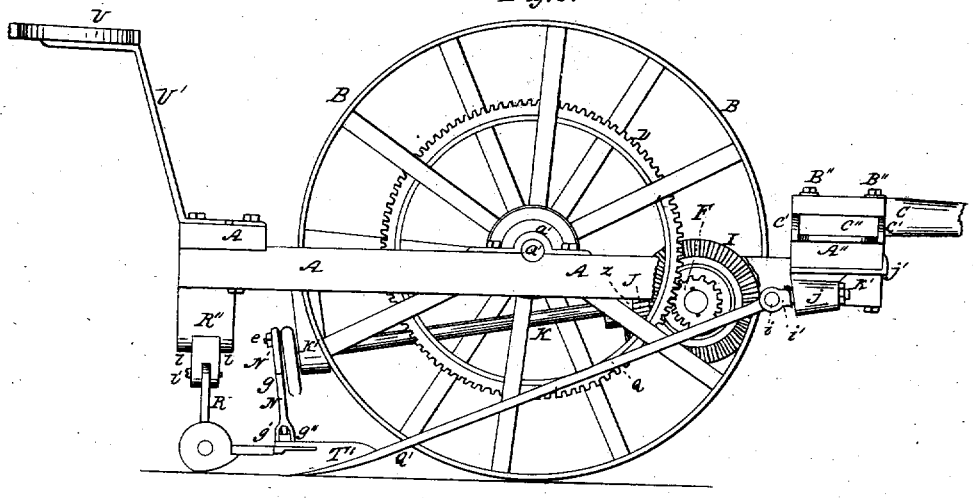
Fig. 7.
Fig. 8.
Fig. 6.
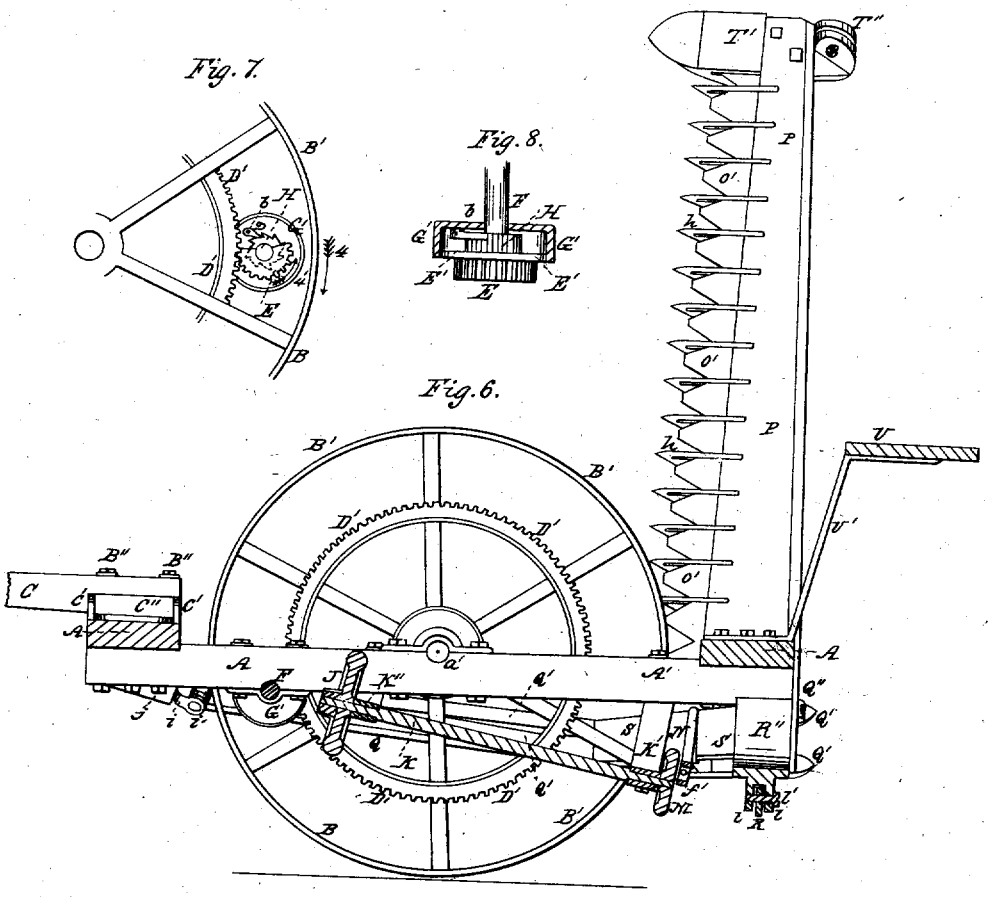
Witnesses:
A C Widdicombe
H M Burley
Inventor:
E. Ball.
By his Attorney
Thos H Dodge
N. PETERS, Photo-Lithographer, Washington, D. C.

3 Sheets—Sheet 3.

E. BALL

Mower.

No. 1,010.

Reissued July 17, 1860.

Witnesses:

John Quincy Adams

A. C. Middlecomb

Inventor:

Ephraim Ball

By His Attorney

Thos. H. Dodge

N. PETERS, Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No. 832, dated September 27, 1859; Reissue No. 1,010, dated July 17, 1860.

DIVISION No. 1.

*To all whom it may concern:*

Be it known that I, EPHRAIM BALL, of Canton, in the county of Stark, in the State of Ohio, have invented certain new and useful Improvements in Mowing-Machines, of which the following is a full, clear, and exact description, reference being had to the accompanying drawings, which make a part of this specification, and in which—

Figure 1:
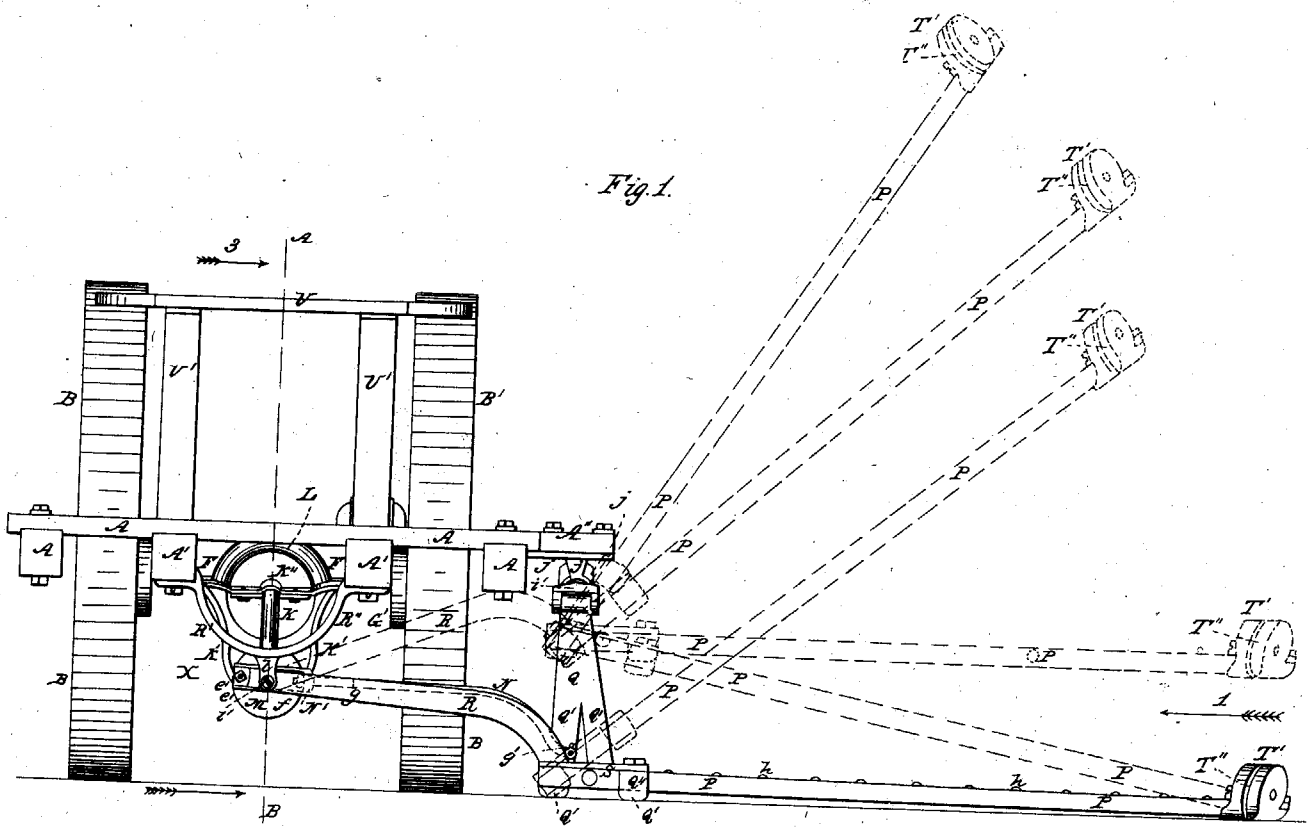
Figure 10:
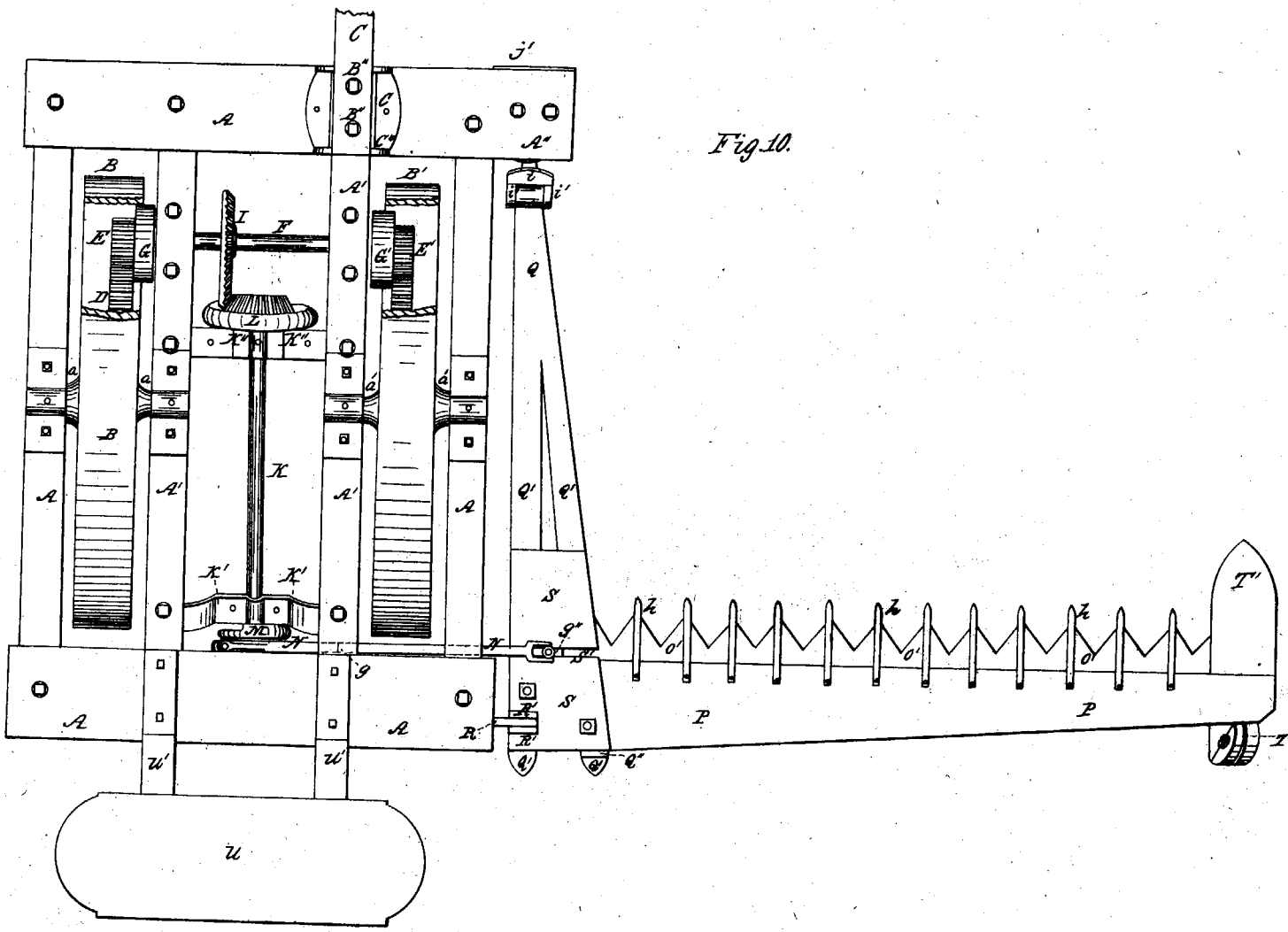

Figure 1 represents a rear view of the machine, the black lines showing the finger-beam resting upon the ground, in the position it will occupy when the machine is mowing upon a level surface, the blue lines showing one position of the finger-beam when mowing on an uneven surface, with its left end raised to conform thereto, the red lines showing the position of the finger-beam when mowing on an uneven surface which raises the entire finger-beam, the dotted black lines showing the position of the finger-beam raised up at its right or outer end toward the machine to pass over an obstacle, and the dotted red lines showing the finger-beam in two different positions raised off of the ground and turned up toward the machine to pass over obstacles or through gates. Fig. 2 represents a side view of the machine, looking in the direction of arrow 1, Fig. 1, when the machine is mowing on level ground, a part of the main frame being represented as broken away to show the position of the gearing. Fig. 3 represents a section on line A B, Fig. 1, looking in the direction of arrow 3, the finger-beam being shown in the highest position represented in red dotted lines, Fig. 1. Fig. 4 represents a detached view of a portion of one of the main wheels and a portion of its gearing, a part of the pinion which gears into one of the main gear-wheels being represented as broken away, together with its shield, to show one of the ratchet-wheels, with its pawl, spring, and case, and by which motion is communicated from the main wheel to the main gear-shaft. Fig. 5 represents a detached plan or top view of one of the pinions on the main gear-shaft, together with its ratchet-wheel and pawl, the top of the case which covers the ratchet-wheel being represented as broken away to show the relative position of the parts. Fig. 6 represents a plan or top view of my machine, a portion of the peripheries of the wheels B B′ being broken away to show the position of the gear-wheels.

When it may be expedient to use one or more of the several parts or branches of my improvements separate from the rest, such part or parts may be used in connection with proper frames and gearing, although different from those herein described, which are proportioned and arranged with reference to the use of the whole of the parts together; and it is obvious that several parts of my improvements are applicable to various other mowing-machines in use.

One mode of applying each of my improvements to practical use being shown in this machine, it is unnecessary to specify the manner of applying the parts respectively to other mowing-machines, since the ordinary skill of the constructer will be sufficient for that purpose.

Whatever form of frame may be used in a mowing-machine, and whatever number of wheels and track-frames are employed to support the frame, unless there are two independent driving-wheels and a hinged cutting apparatus combined therewith, the machine will not fulfill the conditions of a good mower, according to my experience, for if only one driving-wheel is used, if it is placed near the middle of the machine, it will be nearly or quite stationary in turning either to the right or left, and consequently will not operate the cutters during such turning of the machine to keep them from clogging. If the wheel be placed at one side, then it will only operate the cutter when the machine is turned from the wheel. If, on the other hand, two driving-wheels are used, but are both made fast to the same shaft, then in turning either way one wheel cramps the other, and the tendency of one to turn is nearly counteracted by the tendency of the other to remain stationary. Again, even if two independent driving-wheels are used, unless a hinged cutting apparatus is combined therewith, the machine fails to operate to so good advantage, since the cutting apparatus, when controlled in its up and down movements by the main frame, instead of by the undulations of the ground over which it is drawn, is often carried so far above the ground as to leave the stubble very high, and at other times so low as to bring the points of the fingers and cutters into the ground.

That branch of my improvements which forms the subject of this patent consists in combining with the main frame of a mowing-machine two independent driving-wheels and a hinged cutting apparatus which is free to rise and fall at one end or at both ends independently of the main frame.

It also consists in hinging one end of the coupling-arm which sustains the finger-beam laterally to the shoe which sustains the heel of the finger-beam and cutter-bar, in combination with hinging the other end on a line with the longitudinal center of the crank-shaft, for the purpose of preventing the cutters and fingers from being thrown out of their relative position by the rising and falling of the finger-beam to conform to the irregularities of the ground over which it is drawn.

It also consists in so hinging the shoe which supports the heel of the finger-beam and cutter-bar to the main frame that it will move freely laterally as it rises and falls, so as to conform to the circular movement of the end of the coupling-arm to which it is hinged, while at the same time the said shoe is free to rock, turn, or wabble on its hinge with the coupling-arm, whereby all cramping of the joints is obviated and twisting of the parts prevented.

In the accompanying drawings, A A A′ A′ represents the main frame of the machine, being of rectangular form, and which is supported on the axles *a a′* of the independent driving and supporting wheels B B′ as it is drawn over the ground by the rigid tongue C. Spur-wheels D D′ are secured to the inner sides of the spokes of the wheels B B′, the spur-wheel D being secured to wheel B and spur-wheel D′ to wheel B′. The spur-wheels D D′ gear into small pinions E E′, which play loosely on the ends of the main gear-wheel shaft F, which runs in suitable bearings attached to the under side of the central beams, A′ A′, and near the front of the main frame.

To the shaft F there are attached two shields or cases, G G′, within each of which a pawl, *b*, is secured, and these pawls catch into ratchet-teeth on the wheels H, one of which is attached to the inner side of each of the pinion-wheels E E′, or to a disk, E″, which is placed between the ratchet-wheels H and pinion-wheels E E′, for the purpose of closing up the outer ends of the cases G G′, but which are fastened securely to their respective ratchet and pinion wheels, so that each pinion-wheel, with its disk or shield E″ and ratchet-wheel H, turn together and are loose on the shaft F. (See Figs. 7 and 8.)

Small springs *c* are attached to the inside of the cases G G′, one in each case, for the purpose of keeping the pawls *b* in the ratchet-teeth of wheels H when the machine is drawn forward, but which allow the pawls *b* to slip over the teeth on the ratchet-wheels H when the machine is backed, so that the cutters are not operated in backing the machine, nor does one pawl or ratchet interfere with the free movement of the other. Consequently if one wheel moves faster than the other it operates the cutters, and therefore turning the machine from the standing grass to avoid or pass obstructions in the path of the finger-beam does not prevent the cutter from being operated by wheel B′, whereby clogging of the cutter is prevented, which is almost sure to result when the cutters are stopped under such circumstances, inasmuch as the fingers and cutters have to be drawn laterally through the standing grass, unless the team is stopped and the machine backed, which occupies considerable time.

The connecting-rod or pitman is composed of two parts, N and N′. The part N′ is forked at one end and has a hole through the other, the forked end carrying a swivel-piece, *f*, having a hole in the middle to fit on the crank-pin *e* in the wheel M, while one end of the part N is turned down, so as to pass through the hole in the end of N′, where it is held by a nut, *f′*, as shown in dotted lines, Fig. 1. By screwing up the nut *f′* the shoulder *g* on the part N is drawn up firm against the end of N′, thus making the rod or pitman nearly as firm as if made of a single piece. The other end of N is forked, and carries between the ends of its forks a swivel-piece, *g″*, having a hole near its middle to fit over or on a projection, *g′*, on the heel of the cutter-bar O, to which the cutters O′ are attached.

The swivel-piece *f* is so arranged that its axis of motion is nearly vertical, while that of the swivel-piece *g″* is nearly horizontal. By this arrangement all cramping of the pitman, cutter-bar, and cutters is prevented, while the finger-beam P, which carries the cutters, is rising and falling to conform to the inequalities of the ground.

As the machine is drawn over the ground by the rigid draft pole or tongue C the driving-wheels B B′ move in the direction indicated by arrow 4, and as the spur-wheels D D′ move in the same direction the pinion-wheels E E′ are caused to move in the direction of arrow 4, (see Fig. 7,) thus giving motion to shaft F by means of ratchet-wheels H H, pawl *b b*, and cases G G′, and as the shaft F turns motion is communicated to the crank-shaft K through gear-wheels I and J, whereby a rapid reciprocating motion is imparted to the cutter-bar O and its cutters O′, which work through fingers or guards *h*, attached to the finger-beam P, in consequence of the pitman or connecting-rod being attached to the pin *e* and the other end to the projection *g′* on the heel of the cutter-bar.

The cutters and guard-fingers may be made in any of the well-known forms.

The inner end or heel of the finger-beam P is rigidly secured to the lower double runner or forked ends, Q′ Q′, of a strong metallic draft-shoe or yielding brace-bar, Q, the forward end of which extends upward and forward, and is hinged between lugs *i i* of a wrist or swivel, *i'*, which is free to turn on an axis parallel to the line of motion of the machine in a piece, *j*, attached to piece *j'* by a screw-pivot, the piece *j'* being bolted firmly to the under side of the inner projecting part, A'', of the main frame, while the wrist or swivel piece *i'* is held in place by nut *k'*.

The position of the yielding brace-bar or hinged shoe Q is parallel, or nearly so, to the line of motion of the machine, while the position of the finger-beam is at right angles, or nearly so, to the line of motion of the machine, and as the shoe or yielding brace-bar Q is the device by which the finger-beam and cutting apparatus are drawn forward as the machine advances, it is made of metal and very strong, so that it will not buckle or twist under the great longitudinal and lateral strain which it has to bear in drawing forward and sustaining the finger-beam in its proper and relative position as respects the main frame. A coupling-arm, R, is hinged at its right end between the lugs R' R', which project up from the left side or fork of the shoe or yielding brace-bar Q, and at the heel of the finger-beam P, while its left end is hinged on a line with the longitudinal center of the crank-shaft K, between lugs *l l*, projecting down from a hanger, R'', which is firmly bolted to the rear under sides of the pieces A' A' of the main frame.

The object in hinging the left end of the coupling-arm on a line with the longitudinal center of the crank-shaft is to prevent the guard-fingers being thrown out of their relative position as respects the cutters during the rising and falling of the finger-beam, or either end thereof, to conform to the inequalities of the ground independently of the main frame. For instance, suppose, instead of hinging the left end of the coupling-arm, as above described, it should be hinged at the point X, Fig. 1, and the length of the pitman be so arranged that the cutters would pass the fingers at each throw on level ground. It will readily be perceived that when the heel of the finger-beam happened to be raised up on a line parallel to the point X it would be thrown away from the machine to a much greater relative extent than would the heel of the cutter-bar, and consequently destroy the relative position of the cutters and fingers. By my arrangement, however, the cutters and fingers are kept in such relative position that the throw of the cutter-bar is always such as respects the fingers, in whatever position the finger-beam may be, as to pass them at each throw sufficiently to cut the grass, and thus avoid the danger of clogging the cutters or of leaving the grass imperfectly cut. The center of each cutter ought to pass from the center of one guard or finger to the center of the opposite guard or finger at each throw of the crank when mowing on level ground.

While the machine is in operation the finger-beam P, which supports the cutters, can freely rise and fall bodily, or either end can freely rise and fall independently of the other end and of the main frame, since the hinged connection of the yielding brace-bar or shoe Q with the wrist *i'* allows of a free up-and-down movement of the entire finger-beam; and as the wrist or swivel piece *i'* is free to turn in the piece *j* the yielding brace-bar or hinged draft-shoe Q and finger-beam P have also a free rolling or lateral motion at right angles, or nearly so, to the line of motion of the machine, while the coupling-arm, which is hinged to the shoe or yielding brace-bar, to which the heel of the finger-beam is attached, serves to steady the finger-beam laterally, and to prevent it from being wrenched out of place as respects the main frame by the resistance of the grass, or of obstacles in its path.

It will thus be seen that my machine is well adapted for use, not only on even or level surfaces, but on rough and uneven ground, since if an elevation occurs between the outer end of the finger-beam and the inner driving-wheel the finger-beam conforms freely to such inequalities in the ground—one such position being shown in blue lines, Fig. 1—or the outer end can rise to conform to inequalities, while the other end is free to rest on the ground.

As the end of the coupling-arm which is hinged to the shoe or yielding brace-bar Q rises above or falls below a horizontal plane passing through its hinge or joint with the main frame, the shoe or yielding brace-bar is drawn toward the machine, and therefore, to avoid any cramping in the joints of the coupling-arm and shoe or brace-bar Q, the front connection of the yielding brace-bar or shoe Q must be such as to permit the rear thereof to have a free lateral motion sufficient to enable it to conform to the circular motion of the right hinge of the coupling-arm as the finger-beam rises and falls to conform to the inequalities of the ground. One way in which this can be done is shown in my machine, and consists in attaching the piece *j* to the piece *j'* by a pivot, so that the yielding brace-bar or shoe Q can move freely laterally on said pivot as a center.

As the weight of the finger-beam and cutting apparatus rests principally on the ground, I provide for the proper balancing of the machine by placing the independent driving and supporting wheels B B' near the center of the machine—one wheel being on each side—and arrange the gearing so that the weight thereof will be mostly in advance of the axes of the supporting-wheels, whereby I am enabled to place the seat for the driver well back on the machine, where he can have a full view of the cutting apparatus, and yet have the machine evenly and well balanced when the driver is in his seat on the machine.

By the use of two independent driving-wheels the cutters are kept in motion while turning either to the right or left, and that, too, without the least cramping or twisting of the wheels or their journals, since one wheel can move faster than the other, and in mowing on rough and uneven ground, where there is necessarily much turning to avoid obstructions in the path of the cutters, this is very important. Again, if one wheel happens to drop into a slight hole, or strikes against a small stump or stone, so as to cause it to slip on or over the ground, the other wheel operates the cutters.

What I claim under this patent as my invention is—

1. The combination, with the main frame of a mowing-machine, of two independent driving-wheels and a hinged cutting apparatus, whereby the cutters are kept in operation when the machine is turned either to the right or left, while the cutting apparatus, or either end thereof, is free to conform to the inequalities of the ground independently of the up and down motions of the main frame, substantially as set forth.

2. Hinging one end of the coupling-arm R to lugs on the shoe which supports the heel of the finger-beam and cutter-bar, in combination with hinging the other end on a line with the longitudinal center of the crank-shaft which operates the pitman and cutters, substantially as set forth.

3. The combination of the heel of the finger-beam P and one end of the coupling-arm R with a strong metallic draft-shoe, substantially as set forth.

4. So hinging the shoe which supports the heel of the finger-beam to the main frame as that it will permit the heel of the finger-beam, to which it is rigidly attached, to move freely in the arc of a circle as it rises and falls, so as not to cramp or bind the joints of the coupling-arm R, or its equivalent, substantially as set forth.

In witness whereof I have hereunto signed my name.

EPHRAIM BALL.

Witnesses:

DANIEL GOTSHALL,

D. H. HARMER.